US012712843B2

(12) United States Patent
Lee et al.

(10) Patent No.: US 12,712,843 B2
(45) Date of Patent: Aug. 18, 2026

(54) SYSTEMS, METHODS, AND APPARATUSES FOR IMPROVED DOMAIN NAME RESOLUTION

(71) Applicant: Comcast Cable Communications, LLC, Philadelphia, PA (US)

(72) Inventors: Yiu Leung Lee, Philadelphia, PA (US); Charles A. Helfinstine, Philadelphia, PA (US); Thomas Modayil Jacob, Philadelphia, PA (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 54 days.

(21) Appl. No.: 19/002,349

(22) Filed: Dec. 26, 2024

(65) Prior Publication Data

US 2025/0126092 A1 Apr. 17, 2025

Related U.S. Application Data

(63) Continuation of application No. 17/573,357, filed on Jan. 11, 2022, now Pat. No. 12,224,977.

(51) Int. Cl.

| | |
|---|---|
| ***G06F 15/16*** | (2006.01) |
| ***G06F 9/54*** | (2006.01) |
| ***H04L 29/06*** | (2006.01) |
| ***H04L 61/4511*** | (2022.01) |
| ***H04L 61/4552*** | (2022.01) |
| ***H04L 61/5053*** | (2022.01) |

(52) U.S. Cl.
CPC ...... *H04L 61/4511* (2022.05); *H04L 61/4552* (2022.05); *H04L 61/5053* (2022.05)

(58) Field of Classification Search
CPC ............. H04L 61/4511; H04L 61/5053; H04L 61/4552
USPC .......................................................... 709/245
See application file for complete search history.

(56) References Cited

U.S. PATENT DOCUMENTS

| | | | | |
|---|---|---|---|---|
| 9,167,049 | B2 * | 10/2015 | Fliam | H04L 67/2885 |
| 9,215,205 | B1 * | 12/2015 | Smith | H04L 63/101 |
| 9,300,623 | B1 * | 3/2016 | Earl | H04L 61/58 |
| 9,369,345 | B2 * | 6/2016 | Chan | H04L 61/2557 |

(Continued)

FOREIGN PATENT DOCUMENTS

| | | | | |
|---|---|---|---|---|
| EP | 4210296 | A1 * | 7/2023 | H04L 61/4511 |

OTHER PUBLICATIONS

Naeem, M.A. et al. "A Comparative Performance Analysis of Popularity-Based Caching strategies in Named Data Networking," IEEE Access, 2020, pp. 50057-50077, vol. 8.

(Continued)

*Primary Examiner* — Hamza N Algibhah
(74) *Attorney, Agent, or Firm* — Ballard Spahr LLP

(57) ABSTRACT

Described herein are methods and systems for improved domain name resolution/routing. Routing data associated with domain names (e.g., websites) may be cached by a Domain Name System (DNS) based on historical domain name queries. The historical domain name queries may be analyzed to determine a ranking (e.g., popularity) for the domain names at multiple time intervals throughout a day, week, etc. Routing data for the highest ranked domain names during one or more time intervals may be cached for a period(s) of time corresponding to the one or more time intervals (e.g., times during which those domain names are most popular).

21 Claims, 11 Drawing Sheets

(56) References Cited

U.S. PATENT DOCUMENTS 10,033,692 B1* 7/2018 Vavrusa .................. H04L 61/59
11,290,487 B2* 3/2022 Arunachalam ....... H04L 63/061
2011/0153867 A1* 6/2011 van de Ven ............. H04L 61/58 709/245
2012/0124239 A1* 5/2012 Shribman ............. H04L 61/103 709/245
2012/0265900 A1* 10/2012 Richardson ......... H04L 61/4511 709/242
2013/0204961 A1* 8/2013 Fliam .................... H04L 67/568 709/214
2014/0082064 A1* 3/2014 Nicks .................. H04L 61/4511 709/203
2015/0012664 A1* 1/2015 Johnson .................. H04L 45/72 709/238
2015/0019708 A1* 1/2015 Denis ...................... H04L 43/04 709/224
2015/0288648 A1* 10/2015 Seo ..................... H04L 61/4511 709/245
2016/0028847 A1* 1/2016 Bradshaw ............... H04L 61/58 709/213
2016/0381170 A1 12/2016 Crowe et al.
2018/0159815 A1* 6/2018 Halley ................ H04L 67/5681
2020/0045070 A1* 2/2020 Liu ....................... G06F 16/285
2020/0213265 A1* 7/2020 Deshpande ............. H04L 61/58
2020/0236139 A1* 7/2020 Arunachalam ....... H04L 63/205
2021/0119960 A1* 4/2021 Sinha .................. H04L 61/5076
2023/0179565 A1* 6/2023 Peterson ............. H04L 61/4511 709/245

OTHER PUBLICATIONS

European Search Report for related application EP23151174.2 mailed Mar. 27, 2023.

* cited by examiner

Figure 2:
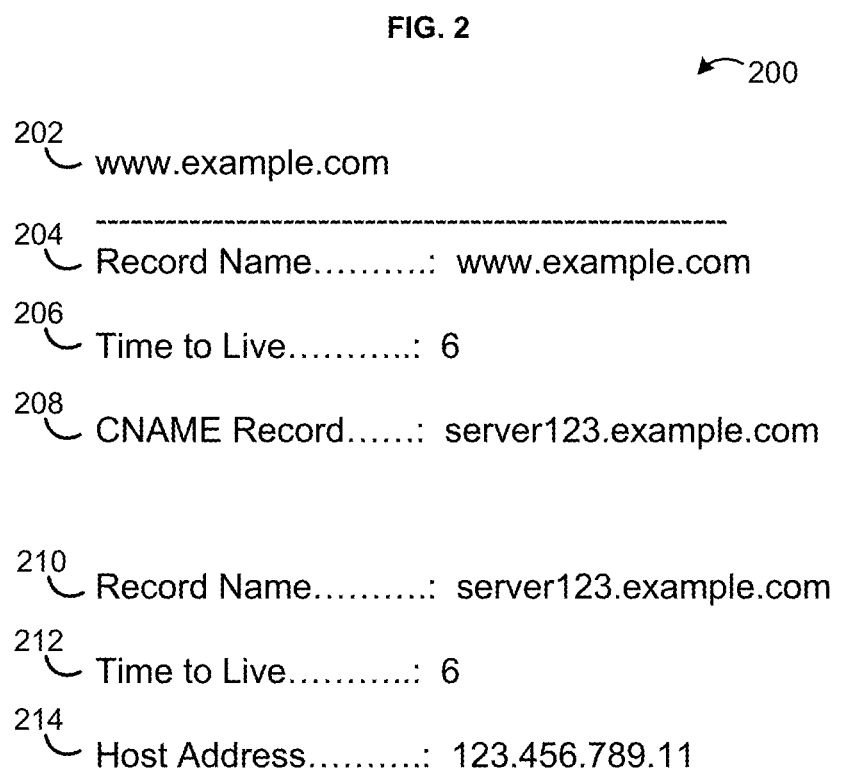

202 www.example.com

---

204 Record Name……….: www.example.com

206 Time to Live………..: 6

208 CNAME Record……: server123.example.com

210 Record Name……….: server123.example.com

212 Time to Live………..: 6

214 Host Address……….: 123.456.789.11

Queries (in thousands) for "www.example.com"

120000
100000
80000
60000
40000
20000
0

QUERIES 0 5 10 15 20 23

TIME (HOUR)

400

- Interval 1 00:00 - 11:00
  <Cache Contents A>
- Interval 2 12:00 - 13:30
  <Cache Contents B>
- Interval 3 13:30 - 14:30
  <Cache Contents C>
- Interval 4 14:30 - 19:30
  <Cache Contents D>
- Interval 5 19:30 - 21:00
  <Cache Contents E>
- Interval 6 21:00 - 23:59
  <Cache Contents F>

```
<Cache Contents E>
 - Ordered List of Domain Names and Relative Use

www.example1.com -> 10000 hits
...
www.example2.com ->  9000 hits
www.example3.com ->    50 hits
...
```

502A
502B ~ 502N
120
100
80
60
40
20
0
1
2
3
4
5
6
7
8
9
10
11
12
13
14
15
16
DOMAIN NAMES
QUERIES

900

910
DETERMINE A QUANTITY OF DOMAIN NAME QUERIES
920
DETERMINE AT LEAST ONE TIME INTERVAL
930
SEND AN INDICATION

1000

1010
DETERMINE A QUANTITY OF DOMAIN NAME QUERIES
1020
DETERMINE A PLURALITY OF RANKINGS
1030
DETERMINE A PLURALITY OF DOMAIN NAMES AND AT LEAST ONE TIME INTERVAL
1040
SEND AN INDICATION

1100

1110
DETERMINE A DISTRIBUTION OF DOMAIN NAME QUERIES
1120
DETERMINE ROUTING DATA
1130
SEND AN INDICATION

SYSTEMS, METHODS, AND APPARATUSES FOR IMPROVED DOMAIN NAME RESOLUTION

CROSS REFERENCE TO RELATED APPLICATION

This application is a continuation of is a continuation of U.S. patent application Ser. No. 17/573,357, filed on Jan. 11, 2022, the content of which is incorporated herein in its entirety

BACKGROUND

When a computing device sends a request to visit a website, such as "www.example.com," the request may be received by a Domain Name System (DNS) that resolves the request and provides the computing device with an Internet Protocol (IP) address for a server associated with the website. Data associated with such requests is routinely cached by the DNS so that subsequent requests for the same website may be more quickly resolved by the DNS. Due to the large number of websites in existence, the DNS may generate more data than it can feasibly or efficiently cache. These and other considerations are described herein.

SUMMARY

It is to be understood that both the following general description and the following detailed description are exemplary and explanatory only and are not restrictive. Described herein are methods and systems for improved domain name resolution. Routing data associated with domain name queries, such as domain names and corresponding Internet Protocol (IP) addresses of associated servers, may be cached for a period of time to expedite processing of subsequent domain name queries. The routing data may be cached, and/or not cached, based on domain name popularity.

Other examples and configurations are possible. Additional advantages will be set forth in part in the description which follows or may be learned by practice. The advantages will be realized and attained by means of the elements and combinations particularly pointed out in the appended claims.

BRIEF DESCRIPTION OF THE DRAWINGS

The accompanying drawings, which are incorporated in and constitute a part of the present description serve to explain the principles of the methods and systems described herein:

FIG. 2 shows example routing data;
FIG. 3 shows an example graph;
FIG. 4 shows example cached routing data.

DETAILED DESCRIPTION

Figure 1:
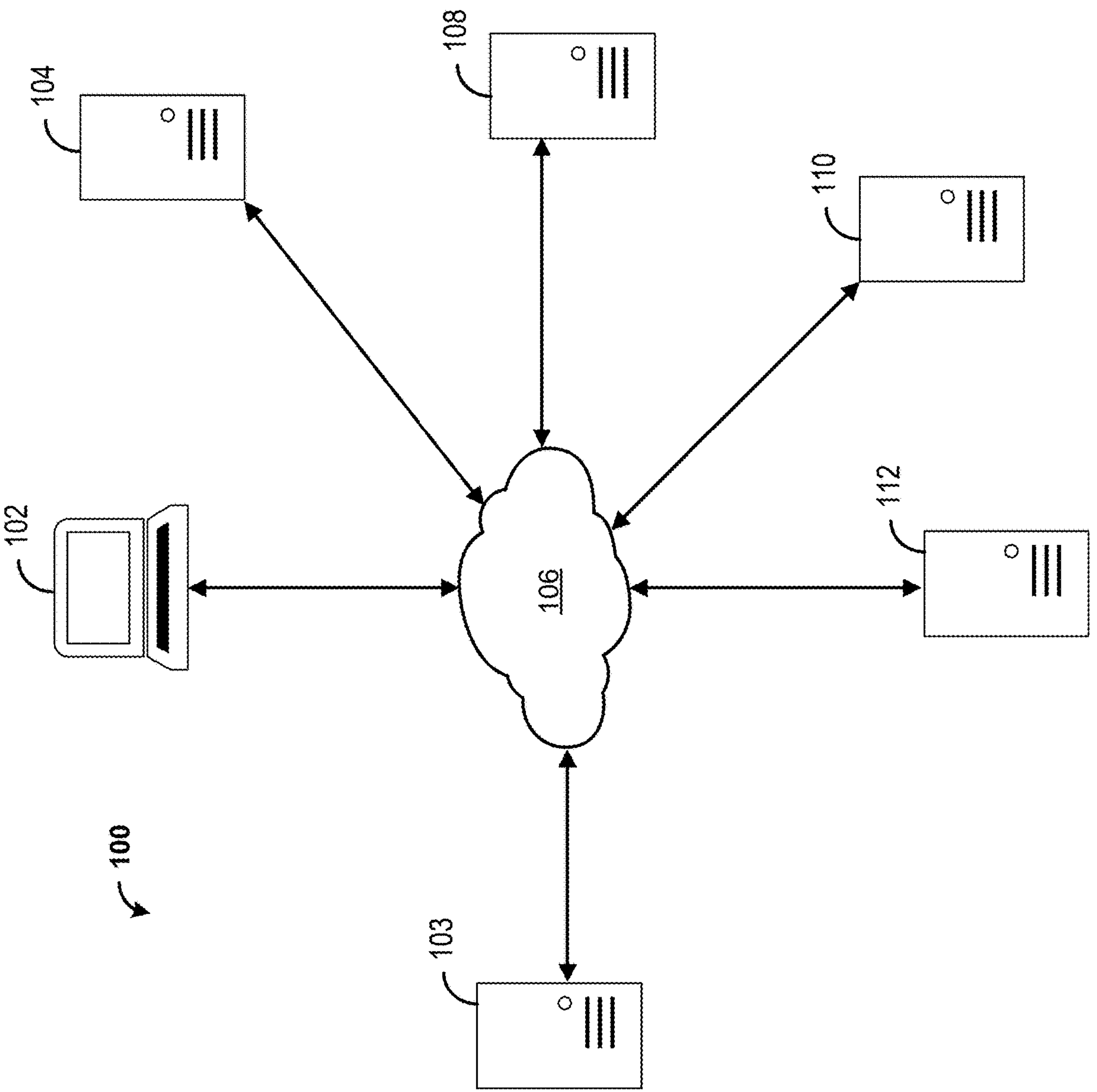
FIG. 1 shows an example system.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another configuration includes from the one particular value and/or to the other particular value. Similarly, when values are expressed as approximations, by use of the antecedent "about," it will be understood that the particular value forms another configuration. It will be further understood that the endpoints of each of the ranges are significant both in relation to the other endpoint, and independently of the other endpoint.

"Optional" or "optionally" means that the subsequently described event or circumstance may or may not occur, and that the description includes cases where said event or circumstance occurs and cases where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal configuration. "Such as" is not used in a restrictive sense, but for explanatory purposes.

It is understood that when combinations, subsets, interactions, groups, etc. of components are described that, while specific reference of each various individual and collective combinations and permutations of these may not be explicitly described, each is specifically contemplated and described herein. This applies to all parts of this application including, but not limited to, steps in described methods. Thus, if there are a variety of additional steps that may be performed it is understood that each of these additional steps may be performed with any specific configuration or combination of configurations of the described methods.

As will be appreciated by one skilled in the art, hardware, software, or a combination of software and hardware may be implemented. Furthermore, a computer program product on a computer-readable storage medium (e.g., non-transitory) having processor-executable instructions (e.g., computer software) embodied in the storage medium. Any suitable computer-readable storage medium may be utilized including hard disks, CD-ROMs, optical storage devices, magnetic storage devices, memresistors, Non-Volatile Random Access Memory (NVRAM), flash memory, or a combination thereof.

Throughout this application reference is made to block diagrams and flowcharts. It will be understood that each block of the block diagrams and flowcharts, and combinations of blocks in the block diagrams and flowcharts, respectively, may be implemented by processor-executable instructions. These processor-executable instructions may be loaded onto a general purpose computer, special purpose computer, or other programmable data processing apparatus to produce a machine, such that the processor-executable instructions which execute on the computer or other programmable data processing apparatus create a device for implementing the functions specified in the flowchart block or blocks.

These processor-executable instructions may also be stored in a computer-readable memory that may direct a computer or other programmable data processing apparatus to function in a particular manner, such that the processor-executable instructions stored in the computer-readable memory produce an article of manufacture including processor-executable instructions for implementing the function specified in the flowchart block or blocks. The processor-executable instructions may also be loaded onto a computer or other programmable data processing apparatus to cause a series of operational steps to be performed on the computer or other programmable apparatus to produce a computer-implemented process such that the processor-executable instructions that execute on the computer or other programmable apparatus provide steps for implementing the functions specified in the flowchart block or blocks.

Blocks of the block diagrams and flowcharts support combinations of devices for performing the specified functions, combinations of steps for performing the specified functions and program instruction means for performing the specified functions. It will also be understood that each block of the block diagrams and flowcharts, and combinations of blocks in the block diagrams and flowcharts, may be implemented by special purpose hardware-based computer systems that perform the specified functions or steps, or combinations of special purpose hardware and computer instructions.

FIG. 1 shows an example system 100. The system 100 may comprise a Domain Name System (DNS) and/or components thereof. The system 100 may comprise a client device 102, a routing device 103, a first cache 104, a second cache 108, a third cache 110, and a fourth cache 112. The client device 102 may comprise a computing device, a user device, a mobile device, etc. Although the system 100 only depicts one client device 102, it is to be understood the system 100 may comprise more than one client device 102. The routing device 103 may comprise a router, switch, server, a combination thereof, and/or the like. Although the system 100 only depicts one routing device 103, it is to be understood the system 100 may comprise more than one routing device 103. Each of the caches 104, 108, 110, 112 may comprise a server, a database(s), a storage medium(s), a combination thereof, and/or the like. Although the system 100 only depicts four caches, it is to be understood the system 100 may comprise more than four caches.

Each of the devices of the system 100 may be in communication via a network 106, such as the Internet. The network 106 may facilitate communication between the client device 102, the routing device 103, the first cache 104, the second cache 108, the third cache 110, and the fourth cache 112. The network 106 may be an optical fiber network, a coaxial cable network, a hybrid fiber-coaxial network, a wireless network, a satellite system, a direct broadcast system, an Ethernet network, a high-definition multimedia interface network, a Universal Serial Bus (USB) network, or any combination thereof. Data may be sent by the client device 102, the routing device 103, the first cache 104, the second cache 108, the third cache 110, and/or the fourth cache 112 via a variety of transmission paths, including wireless paths (e.g., satellite paths, Wi-Fi paths, cellular paths, etc.) and terrestrial paths (e.g., wired paths, a direct feed source via a direct line, etc.).

Domain name queries associated with requests to visit websites may be processed by the system 100. Each domain name query may be resolved by the system 100 to determine an address (e.g., Internet protocol (IP) address) for a server associated with the corresponding website/domain name (e.g., www.example.com). Routing data for each domain name (e.g., DNS resolution data) may comprise the domain name and the address(es) for the corresponding server(s) associated with the website/domain name. As further described herein, routing data may be cached at the caches 104, 108, 110, 112. However, caching routing data for every domain name may not be possible or recommended, due to the immense amount of data that would be required as well as capacity limitations of the system 100 and associated devices (e.g., memory size, processing power, etc., associated with the plurality of computing devices).

The system 100 may selectively cache routing data for certain websites during certain periods of a day. For example, data associated with historical domain name queries may be analyzed by the system 100 to determine which domain names/websites are most popular during a plurality of time intervals (e.g., blocks of hours throughout a day(s)). Each domain name may be ranked according to its popularity within a particular time interval. For example, a distribution of domain name queries for a plurality of domain names, such as the top 50,000 websites, may be determined. The distribution may be associated with a period of time, such as a day, week, etc. The distribution may be indicative of each domain name's relative popularity at each of a plurality of time intervals throughout the period of time. A time interval may comprise, for example, a block of hours within a day (e.g., 6 AM-11 AM).

The distribution may be used to determine a ranking for each of the domain names based on the corresponding quantity of domain name queries within each time interval. The routing data for the "top ranked" domain names may be cached by the system 100. For example, the distribution may be used to determine that a first domain name is very popular during a first time interval but less popular during a second time interval. The system 100 may cache the routing data for the first domain name at one or more of the caches 104, 108, 110, 112 for a period of time corresponding to the first time interval (e.g., between 4 AM and 9 AM). The system 100 may not cache the routing data for the first domain name outside of that time interval. For example, the system 100 may not cache the routing data for the first domain name outside of 4 AM-9 AM.

As further described herein, the caches 104, 108, 110, 112 may be distributed geographically and/or may be configured to cache routing data based on geographical need. For example, the cache 104 may be located at (or configured to serve) a first geographic location (e.g., the U.S. east coast), and the cache 108 may be located at (or configured to serve) a second geographic location (e.g., the U.S. west coast). The routing data for the first domain name may be cached at the cache 104 for a period of time corresponding to the first time interval at the first geographic location (e.g., between 4 AM and 9 AM Eastern Time). The routing data for the first domain name may also be cached at the cache 108 for a period of time corresponding to the first time interval at the second geographic location (e.g., between 4 AM and 9 AM Pacific Time).

The cached routing data for one or more domain names may be stored at more than one of the caches 104, 108, 110, 112 (e.g., for load balancing and/or failover purposes). For example, the routing data for the first domain name may be cached at the cache 104 as well as at the cache 108 for a first period of time corresponding to the first time interval at the first geographic location (e.g., between 4 AM and 9 AM Eastern Time). As further described herein, the routing device 103 may direct domain name queries for the first domain name during the first period of time to the cache 104 and/or the cache 108 as part of load balancing, a failover procedure, etc.

The system 100 may comprise a DNS and/or components thereof. For example, the client device 102 may receive a command from a user to access a website, such as "www.example.com," and the client device 102 may send a domain name query (e.g., a request) to the routing device 103 to ascertain an Internet protocol (IP) address for a server(s) that is associated with the website (the "website server"). The routing device 103 may receive the domain name query from the client device 102 via the network 106. The domain name query may be resolved to determine the IP address for the website server. The routing device 103 may route the domain name query to the first cache 104 (e.g., based on routing rules, a load balancing protocol, etc.).

The first cache 104 may determine whether a DNS cache stored at the first cache 104 (or at any other device of the system 100) indicates/identifies the IP address for the website server. The first cache 104 may determine that no record exits in the DNS cache for the website server. The first cache 104 may forward the domain name query to a DNS server or another computing device within the DNS (not shown) to determine the IP address of the website server. The first cache 104 may receive the IP address for the website server (e.g., from the DNS server) and send the IP address to the client device 102.

The first cache 104 (and/or another any other device of the system 100) may create a record to be stored in the DNS cache. For example, to avoid repeating the above process for each subsequent domain name query for "www.example.com," the first cache 104 (and/or another any other device of the system 100) may create the record to be stored in the DNS cache. The record may be associated with the IP address for the website server associated with "www.example.com." Using the stored record for the website server in the cache, subsequent domain name queries associated with "www.example.com" may be more quickly processed/resolved by the system 100.

FIG. 2 shows an example record 200 of the DNS cache (e.g., example routing data). Unless otherwise stated herein, the phrase "DNS cache" may refer to a cache, database, storage medium, etc., stored at any (or all) of devices 103-112 of the system 100. The record 200 may be associated with a specific website address 202 (e.g., "www.example.com"). The record 200 may comprise a time-to-live (TTL) element 206. The TTL element 206 may be configured to cause the record 200 to be cleared from the DNS cache after a period of time (e.g., a quantity of seconds, minutes, hours, days, etc.). The record 200 may comprise a CNAME (canonical name) record identifier 208 associated with an alias name/identifier for the corresponding website (e.g., "www.example.com"). For example, the CNAME record identifier 208 may be a CNAME DNS record that maps the alias name/identifier to a true domain name 210 for the website (e.g., "server123.example.com"). The true domain name 210 may be associated with a time-to-live (TTL) element 212 stored within the record 200. The TTL element 212 may be configured to cause the true domain name 210 and/or the entire record 200 to be cleared from the DNS cache after a period of time (e.g., a quantity of seconds, minutes, hours, days, etc.). The true domain name 210 may be associated with an IP address 214 stored within the record 200 for a server associated with the website (e.g., 123.456.789.11). Returning to the example above, the first cache 104 may generate and/or store the record 200, and the record 200 may be retrieved be any of the caches 104, 108, 110, 112 when processing/resolving subsequent domain name queries associated with "www.example.com."

The record 200 and similar records within the DNS cache that identify a server(s) for each of a plurality of domain names may be referred to herein as "routing data." The routing data may be cached at any (or all) of devices 103-112 of the system 100. However, caching all of the routing data for every domain name may not be possible or recommended, due to the immense amount of data that would be required as well as capacity limitations of the devices 103-112 (e.g., memory size, processing power, etc., associated with the devices 103-112). The system 100 may selectively cache the routing data for certain websites during certain periods of a day (or any other period of time). For example, data associated with historical domain name queries may be analyzed by the system 100 (or another device/system) to determine which domain names/websites are most popular during a plurality of time intervals (e.g., blocks of hours throughout a day(s)).

Each domain name may be ranked according to its popularity within a particular time interval. For example, a distribution of domain name queries for a plurality of domain names, such as the top 50,000 websites, may be determined. The distribution may be associated with a period of time, such as a day, week, etc. The distribution may be indicative of each domain name's relative popularity at each of a plurality of time intervals throughout the period of time. A time interval may comprise, for example, a block of hours within a day (e.g., 6 AM-11 AM).

Figure 3:
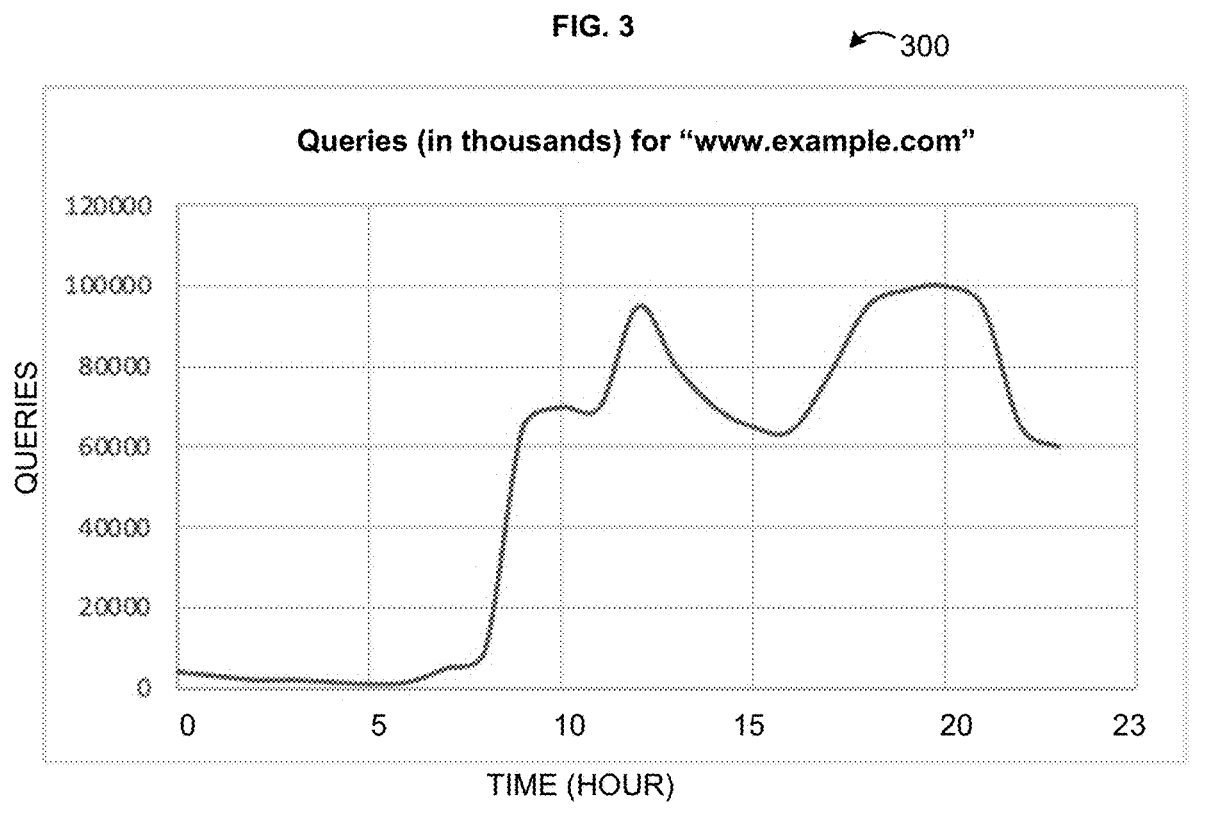

FIG. 3 shows an example graph 300 depicting a distribution of domain name queries (y-axis) for a first domain name/website, "www.example.com," throughout a day (hours 0-23 shown at the x-axis). As the graph 300 indicates, the first domain name is least popular between approximately Midnight and 7:30 AM (e.g., a first time interval), and it is most popular between approximately 4:00 PM and 10:00 PM (e.g., a second time interval). The system 100 may use the distribution for the first domain name as well as distributions for other top domain names (e.g., the top 50,000 websites) to determine a ranking for each of the domain names based on the corresponding quantity of domain name queries. The routing data for the "top ranked" domain names may be cached by the system 100.

The system 100 may determine the distribution for each of the domain names by determining a quantity of domain name queries for each domain name throughout a day(s) (or the particular period for which historical domain name queries are being analyzed). The system 100 may determine a plurality of time intervals for the day(s), such as: 00:00-06:00, 06:00-12:00, 12:00-15:00, 15:00-18:00, 18:00-21:00, 21:00-23:00). For example, the system 100 may determine the plurality of time intervals based on the quantity of domain name queries for each domain name throughout period of time for which historical domain name queries are analyzed (e.g., a day(s), week(s), month(s), etc.). For example, the system 100 may divide the quantity of domain name queries into a defined/determined quantity of time intervals (e.g., 6). While the examples described herein indicate a total of 6 intervals, it is to be understood that the system 100 may divide the quantity of domain name queries into more or less intervals. The number of intervals used by the system 100 may be defined/determined based on the caches 104,108,110,112, such as memory capacity of each (or in the aggregate), computing power of each (or in the aggregate), a combination thereof, and/or the like. The distribution of domain name queries may be determined and/or analyzed by one or more computing devices that are part of the system 100 or by one or more other computing devices not shown in the system 100 (e.g., a remote server(s) in communication with the devices of the system 100).

As shown in FIG. 3, the distribution of domain name queries may comprise a curve/line. The system 100 may determine an area under the curve/line at each of the plurality of time intervals. For example, the system 100 may determine the area under the curve/line at each of the plurality of time intervals using a line integral show below (where $f(x)$ is the curve/line indicating the distribution):

$$\int_0^6 f(x)dx,\ \int_6^{12} f(x)dx,\ \int_{12}^{15} f(x)dx,$$
$$\int_{15}^{18} f(x)dx,\ \int_{18}^{21} f(x)dx \text{ and } \int_{21}^{23} f(x)dx$$

For each time interval of the plurality of time intervals, the system 100 may compare the area value computing using the line integral to determine a ranking for each domain name (e.g., highest area value to lowest). The system 100 may cache the routing data for the "top" domain names for a given time interval based on the ranking (e.g., the most popular domain names/websites for that time interval). The number of domain names and corresponding routing data that are cached at any given time interval may be based on capacity limitations of the devices 103-112 (e.g., memory size, processing power, etc., associated with the devices 103-112).

Based on the ranking for any particular domain name, the system 100 may selectively cache the routing data that domain name during certain periods of a day (or any other period of time). For example, based on the ranking for the first domain name, the system 100 may not cache the routing data for the first domain name between Midnight and 7:30 AM (e.g., the first time interval). However, the system 100 may cache the routing data for the first domain name at one or more of the caches 104, 108, 110, 112 between 4:00 PM and 10:00 PM (e.g., the second time interval).

FIG. 4 shows a plurality of time intervals 400 (Intervals 1-6) and example cached routing data 410 for one of the time intervals (Interval 5). The cached routing data 410 for Interval 5 may indicate a list of domain names and their corresponding server(s) IP address(es) (e.g., such as the record 200). The cached routing data 410—as well as corresponding cached routing data for the other time intervals—may be stored/cached at one or more of the caches 104, 108, 110, 112. Although the system 100 depicts each of the caches 104, 108, 110, 112 as a single device (e.g., a DNS server), it is to be understood that each cache may comprise a system of devices (e.g., DNS servers).

Figure 5:
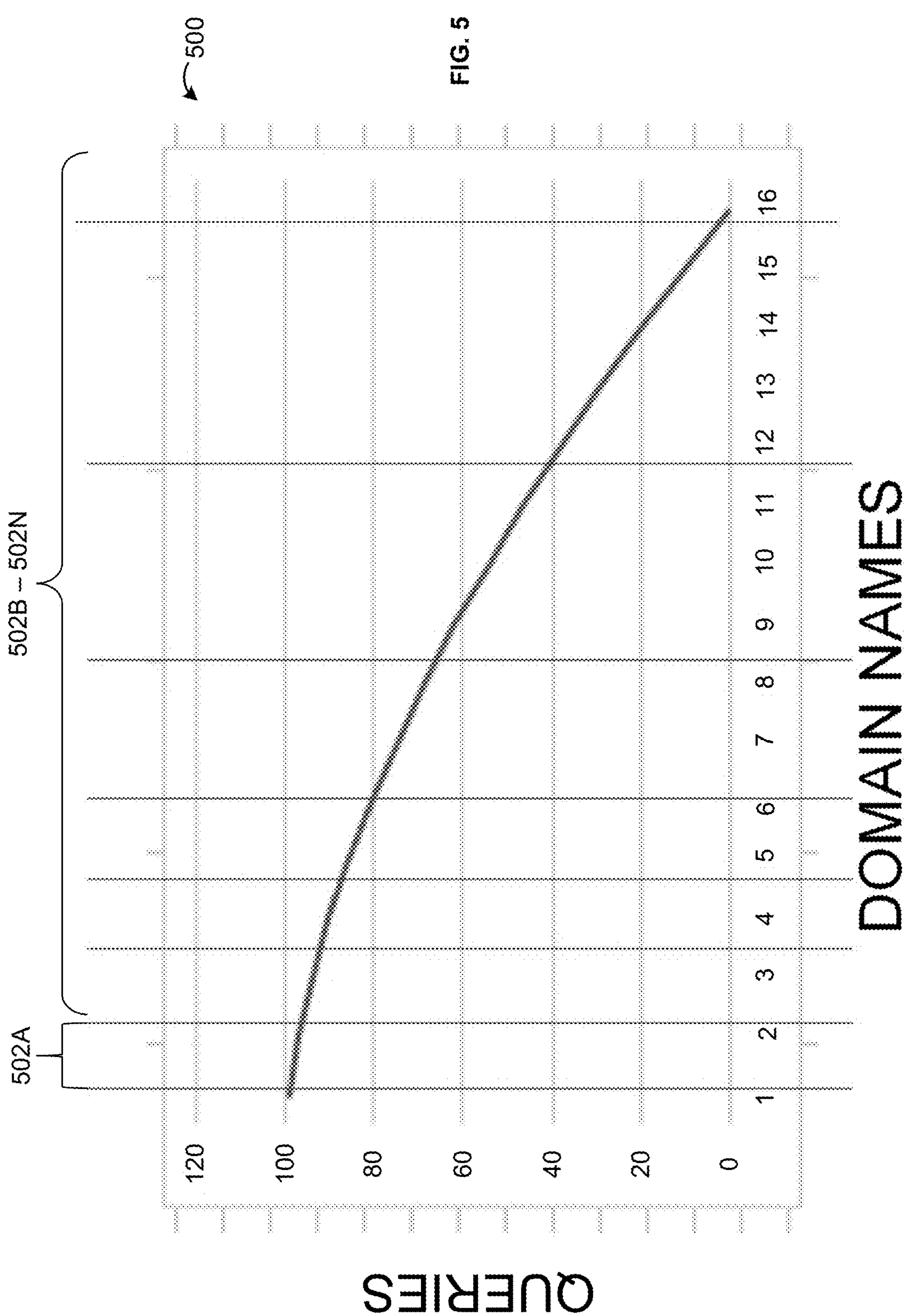
FIG. 5 shows an example graph.

The system 100 (e.g., the routing device 103) may divide/balance the amount of routing data to cache at each of the caches 104, 108, 110, 112 at each time interval of a plurality of time intervals. For example, the system 100 may determine a plurality of portions of a distribution of domain name queries for a plurality of domain names at a particular time interval. FIG. 5 shows an example graph 500 of a distribution of domain name queries for a plurality of domain names (identified at the x-axis as domain names 1-16) for a first time interval of a plurality of time intervals.

As shown in FIG. 5, the distribution may be divided into a plurality of portions (502A and 502B-502N). The plurality of portions (e.g., the quantity of portions) may be determined based on a quantity of caches that are used for storage/caching of the routing data. For example, as shown in FIG. 5, the distribution may be divided into eight portions 502A-502N based on eight caches (or eight systems of caches) that are used for storage/caching of the routing data. Each portion of the plurality of portions may comprise a substantially equal number of domain name queries. The substantially equal number of domain name queries may be determined based on an area under a curve of the distribution as shown in FIG. 5 computing using a line integral (similar to the line integral discussed above).

Figure 6:
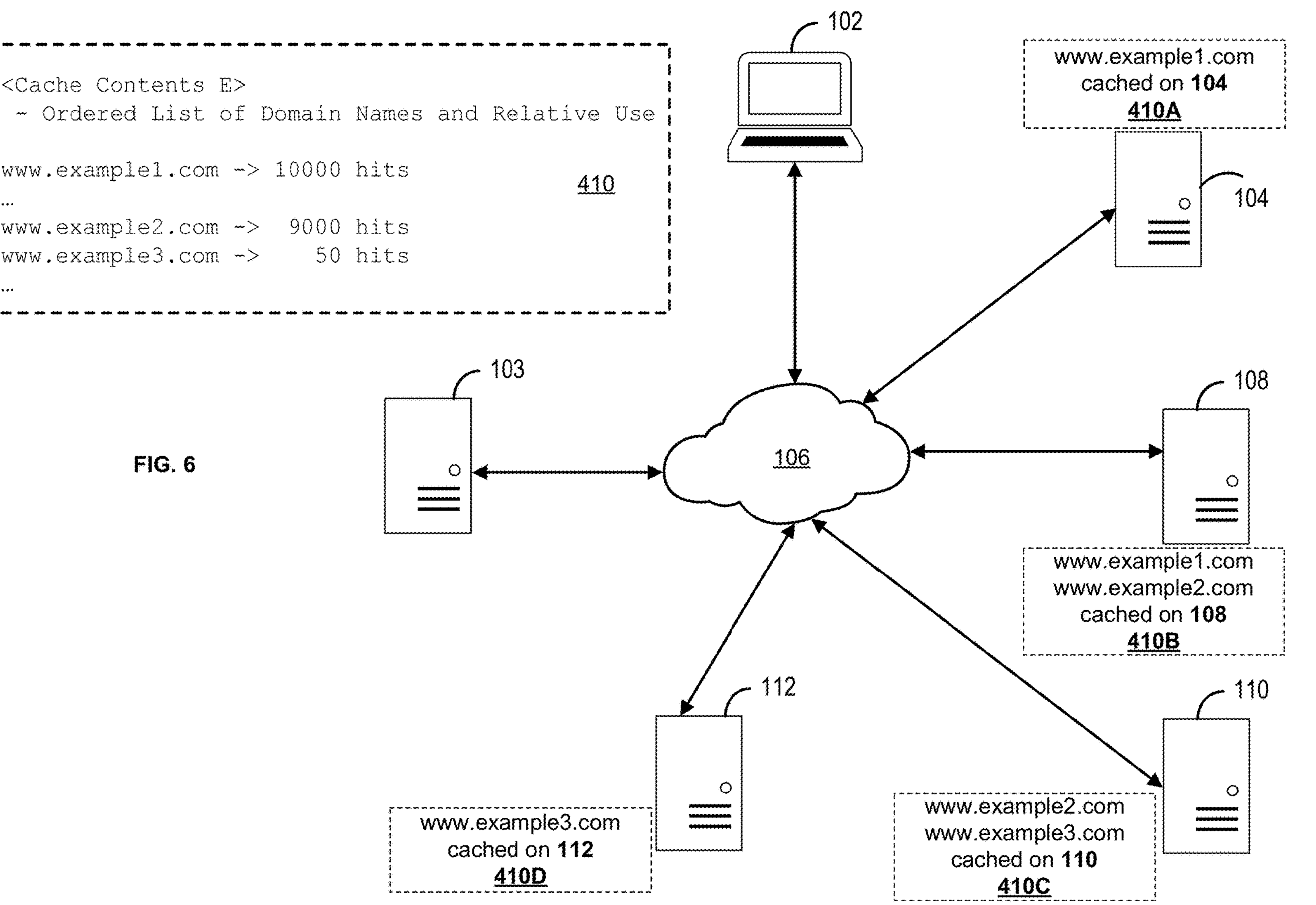
FIG. 6 shows an example system.

FIG. 6 shows an example configuration of the system 100 and the distribution of the example routing data 410 at the caches 104, 108, 110, 112 for a time interval of a plurality of time intervals. The caches 104, 108, 110, 112 may be distributed geographically. For example, the first cache 104 may be located at (or configured to serve) a first geographic location (e.g., the U.S. east coast), and the second cache 108 may be located at (or configured to serve) a second geographic location (e.g., the U.S. west coast). Other examples for geographic placement of the caches 104, 108, 110, 112 are possible as well.

The caches 104, 108, 110, 112 may be configured to cache the routing data 410 (or portions thereof) based on geographical need. The routing data may be distributed among the caches 104, 108, 110, 112 based on geographical need to account for fluctuating popularity of certain domains names at different times of the day. For example, routing data for domain names that are popular consistently throughout the day may be cached at each of the caches 104, 108, 110, 112. Domain names that are popular consistently throughout the day may include, for example, ones related to news, weather, a search engine(s), social media, etc. Routing data for domain names that are popular within a particular region(s) may be cached at any of the caches 104, 108, 110, 112 corresponding to (e.g., located within or configured to serve) that particular region(s). Other examples for geographic distribution of the routing data 410 at the caches 104, 108, 110, 112 are possible as well.

As shown in FIG. 6 portions of the routing data 410 may be stored at more than cache. (e.g., for load balancing and/or failover purposes). For example, the routing data 410 may comprise routing data for three domain names: www.example1.com, www.example2.com, and www.example3.com. The routing device 103 may send a first indication (e.g., a message, an instruction, etc.) to the cache 104 regarding a first portion 410A of the routing data 410 associated with the domain name www.example1.com. The cache 104 may store/cache the first portion 410A for a period of time corresponding to the time interval indicated by the routing device 103 and/or indicated by a TTL element within the first portion 410A (e.g., the TTL 206 and/or 212). The routing device 103 may send similar indications to the caches 108, 110, and 112 regarding a second portion 410B, a third portion 410C, and a fourth portion 410D of the routing data 410. As shown in FIG. 6, as a result of the routing device 103 distributing the portions of the routing data 410 among the caches 104, 108, 110, 112, the routing data for each of the three domain names may be stored at two of the caches 104, 108, 110, 112. The routing data 410 may be distributed in this manner for load balancing and/or failover purposes. For example, if the cache 104 becomes unavailable to process domain name queries, the cache 108 may process domain name queries for www.example1.com using the stored/cache second portion 410B.

The routing device 103 may direct domain name queries among caches that comprise routing data for a same domain name for load balancing/redundancy purposes. Caches that comprise routing data for a same domain name may be associated with a group identifier (e.g., an IP address) for routing purposes. The caches 104, 108, 110, 112 may each send an indication to the routing device 103 and to each other cache regarding their respective placement within a topology of the system 100. For example, each of the caches 104, 108, 110, 112 may indicate to the routing device 103 and to each other cache a number of hops they are away from the routing device 103 and/or one another. The caches 104, 108, 110, 112 may indicate this information by sending an Anycast Border Gateway Protocol message (or any other suitable networking message) to ever other cache and the routing device 103. The routing device 103 (or the caches) may determine a group for load balancing/redundancy purposes based on the number of hops between each of the caches 104, 108, 110, 112 and the routing device 103.

Figure 7:
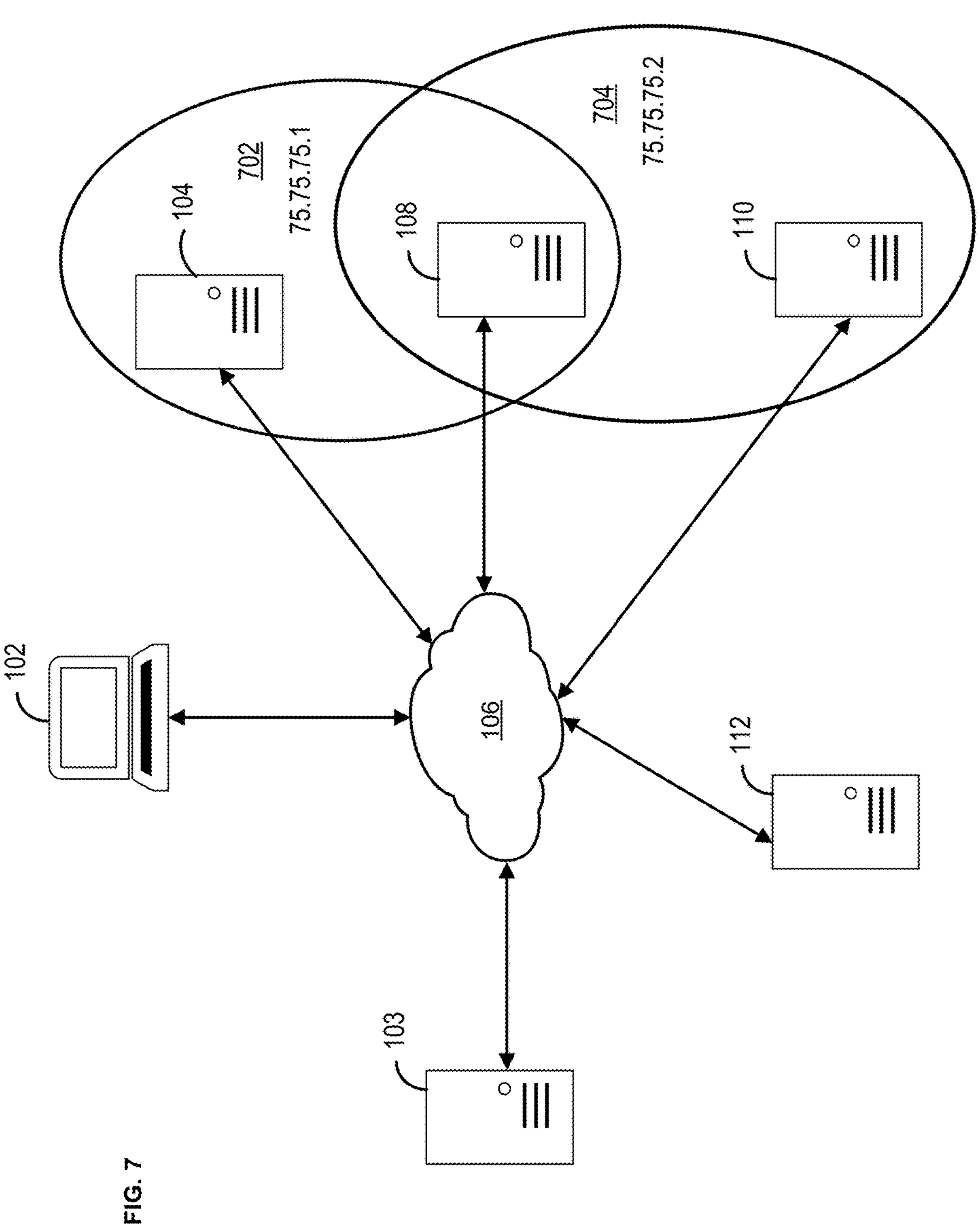
FIG. 7 shows an example system.

For example, FIG. 7 shows an example configuration of the system 100 where each of the caches 104, 108, 110, 112 are a same number of hops away from one another and from the routing device 103. Any two (or more) of the caches 104, 108, 110, 112 that are an equal number of hops away from one another may form a group and determine a group identifier. For example, the cache 104 and the cache 108 may form a group associated with a group identifier 702 (e.g., an IP address). The group identifier 702 may be assigned by the cache 104, the cache 108, the routing device 103, another device (not shown), etc. As shown in FIG. 6, the cache 104 and the cache 108 may comprise portions of the routing data 410 for www.example1.com. The routing device 103 may use the group identifier 702 to route domain name queries for www.example1.com to the cache 104 and the cache 108. Similarly, the cache 108 and the cache 110 may form a group associated with a group identifier 704 (e.g., an IP address). The group identifier 704 may be assigned by the cache 108, the cache 110, the routing device 103, another device (not shown), etc. As shown in FIG. 6, the cache 108 and the cache 110 may comprise portions of the routing data 410 for www.example2.com. The routing device 103 may use the group identifier 704 to route domain name queries for www.example2.com to the cache 108 and the cache 110.

Figure 8:
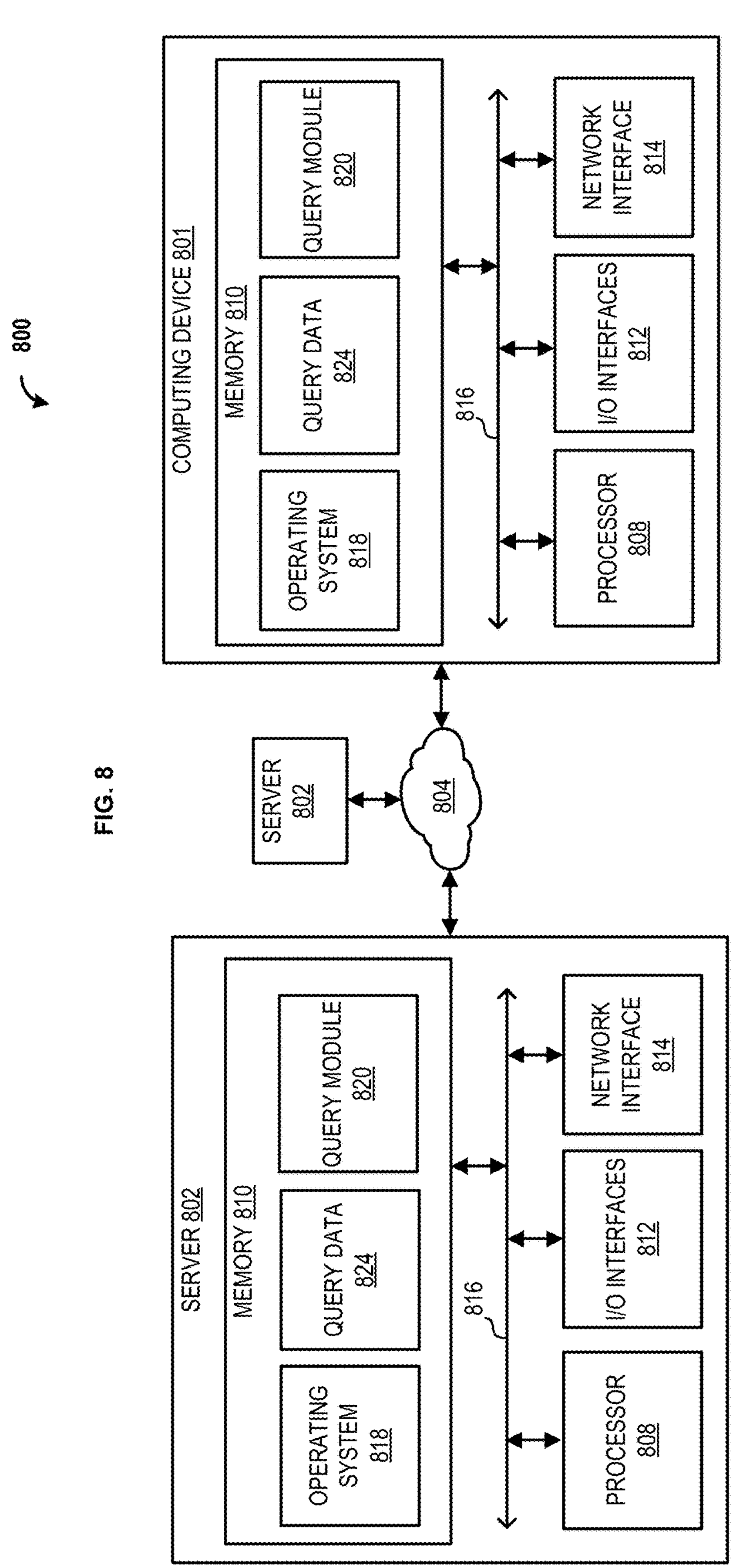
FIG. 8 shows an example system.

As discussed herein, the present methods and systems may be computer-implemented. FIG. 8 shows an example system 800 comprising non-limiting examples of a computing device 801 and a server 802 connected through a network 804. In an aspect, some or all steps of the methods described herein may be performed on a computing device, such as the computing device 801 or the server 802. Any of the devices shown in FIG. 1, 6, or 7 may be a computing device 801 or a server 802. The computing device 801 and/or the server 802 may comprise one or multiple modules/devices/storage repositories configured to store domain name query data, routing data, and/or the like. Multiple servers 802 may communicate with the computing device 801 via the through the network 804.

The computing device 801 and the server 802 may be a digital computer that, in terms of hardware architecture, generally includes a processor 808, memory system 810, input/output (I/O) interfaces 812, and network interfaces 814. These components (808, 810, 812, and 814) are communicatively coupled via a local interface 816. The local interface 816 may be, for example, but not limited to, one or more buses or other wired or wireless connections, as is known in the art. The local interface 816 may have additional elements, which are omitted for simplicity, such as controllers, buffers (caches), drivers, repeaters, and receivers, to enable communications. Further, the local interface may include address, control, and/or data connections to enable appropriate communications among the aforementioned components.

The processor 808 may be a hardware device for executing software, particularly that stored in memory system 810. The processor 808 may be any custom made or commercially available processor, a central processing unit (CPU), an auxiliary processor among several processors associated with the computing device 801 and the server 802, a semiconductor-based microprocessor (in the form of a microchip or chip set), or generally any device for executing software instructions. When the computing device 801 and/or the server 802 is in operation, the processor 808 may be configured to execute software stored within the memory system 810, to communicate data to and from the memory system 810, and to generally control operations of the computing device 801 and the server 802 pursuant to the software.

The I/O interfaces 812 may be used to receive user input from, and/or for providing system output to, one or more devices or components. User input may be provided via, for example, a keyboard and/or a mouse. System output may be provided via a display device and a printer (not shown). I/O interfaces 812 may include, for example, a serial port, a parallel port, a Small Computer System Interface (SCSI), an infrared (IR) interface, a radio frequency (RF) interface, and/or a universal serial bus (USB) interface.

The network interface 814 may be used to transmit and receive from the computing device 801 and/or the server 802 on the network 804. The network interface 814 may include, for example, a 10BaseT Ethernet Adaptor, a 100BaseT Ethernet Adaptor, a LAN PHY Ethernet Adaptor, a Token Ring Adaptor, a wireless network adapter (e.g., WiFi, cellular, satellite), or any other suitable network interface device. The network interface 814 may include address, control, and/or data connections to enable appropriate communications on the network 804.

The memory system 810 may include any one or combination of volatile memory elements (e.g., random access memory (RAM, such as DRAM, SRAM, SDRAM, etc.)) and nonvolatile memory elements (e.g., ROM, hard drive, tape, CDROM, DVDROM, etc.). Moreover, the memory system 810 may incorporate electronic, magnetic, optical, and/or other types of storage media. Note that the memory system 810 may have a distributed architecture, where various components are situated remote from one another, but may be accessed by the processor 808.

The software in memory system 810 may include one or more software programs, each of which comprises an ordered listing of executable instructions for implementing logical functions. In the example of FIG. 8, the software in the memory system 810 of the computing device 801 may comprise a query module 820 (e.g., configured to perform the steps of the methods described herein), query data 824 (e.g., domain name queries), and a suitable operating system (O/S) 818. In the example of FIG. 8, the software in the memory system 810 of the server 802 may comprise, the query data 824, and a suitable operating system (O/S) 818. The operating system 818 essentially controls the execution of other computer programs and provides scheduling, input-output control, file and data management, memory management, and communication control and related services.

For purposes of illustration, application programs and other executable program components such as the operating system 818 are illustrated herein as discrete blocks, although it is recognized that such programs and components may reside at various times in different storage components of the computing device 801 and/or the server 802. Any of the described methods may be performed by computer readable instructions embodied on computer readable media. Computer readable media may be any available media that may be accessed by a computer. By way of example and not meant to be limiting, computer readable media may comprise "computer storage media" and "communications media." "Computer storage media" may comprise volatile and non-volatile, removable and non-removable media implemented in any methods or technology for storage of information such as computer readable instructions, data structures, program modules, or other data. Exemplary computer storage media may comprise RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by a computer.

Figure 9:
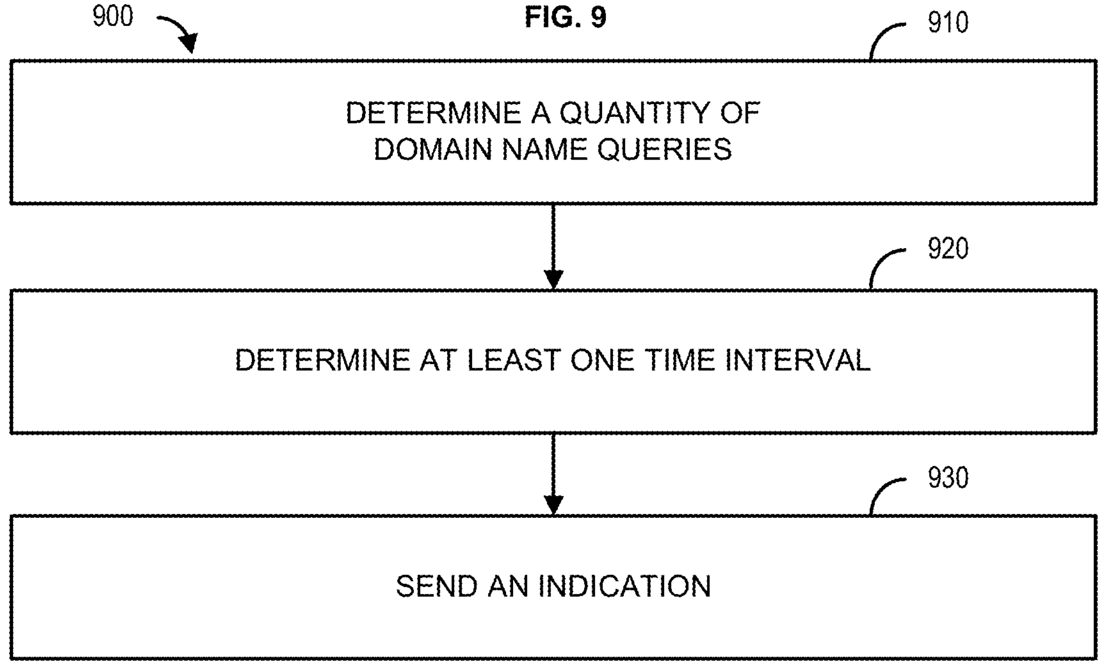
FIG. 9 shows a flowchart for an example method.

FIG. 9 shows a flowchart of an example method 900 for improved domain name resolution. The method 900 may be performed in whole or in part by a single computing device, a plurality of computing devices, and the like. For example, the first cache 104, the second cache 108, the third cache 110, the fourth cache 112, the routing device 103, the computing device 801, and/or the server 802 may be configured to perform the method 900.

As discussed herein, caching routing data at a DNS for every domain name may not be possible or recommended, due to the immense amount of data that would be required as well as capacity limitations of DNS computing devices (e.g., servers, caches, etc.). Data associated with historical domain name queries may be analyzed by a computing device (e.g., any of the devices 103-112 of the system 100) to determine which domain names/websites are most popular during one or more time intervals (e.g., blocks of hours throughout a day(s)). At step 910, the computing device may determine a quantity of domain name queries for each time interval of a plurality of time intervals. For example, the computing device may determine the quantity of domain name queries for each time interval of the plurality of time intervals for a first domain name (e.g., www.example.com).

At step 920, the computing device may determine at least one time interval of the plurality of time intervals for storage of routing data associated with the first domain name. For example, the computing device may determine the at least one time interval based on the quantity of domain name queries for each time interval. The computing device may determine that the routing data is to be stored at the cache for a first period of time that corresponds to a first time interval (e.g., the at least one time interval). For example, the computing device may determine that the routing data is to be stored at the cache for the first period of time based on the quantity of domain name queries for the first time interval of the plurality of time intervals (e.g., a time interval during which the domain name is most popular). The computing device may determine that the routing data is to be stored at the cache for the first period of time based on a ranking for the first domain name for the first time interval. The ranking may be based on the quantity of domain name queries for the first time interval for the first domain name relative to domain name queries for a plurality of domain names during the first time interval.

The computing device may determine that the routing data is to be excluded from storage at the cache for a second period of time that corresponds to a second time interval (e.g., a time interval during which the domain name is less popular). The computing device may determine that the routing data is to be excluded from storage at the cache for the second period of time based on the ranking for the first domain name for the first time interval and a ranking for the first domain name for the second time interval.

At step 930, the computing device may send an indication of the at least one time interval and the routing data (e.g., for storage in memory). For example, the computing device may send the indication of the at least one time interval and the routing data to a cache (e.g., any of the caches 104, 108, 110, 112). The indication may comprise a message indicating that the routing data is to be stored for the first time period (e.g., the at least one time interval) and excluded from storage for the second time period. The first period of time may comprise a first range of time associated with a geographic location (e.g., morning hours), and the second period of time may comprise a second range of time associated with the geographic location (e.g., evening hours). The cache may receive the indication from the computing device. The cache may cause the routing data to be stored for a period of time based on the at least one time interval. The cache may also cause the routing data to be excluded from the DNS cache for another period of time based on the at least one time interval (e.g., during the second time interval).

Figure 10:
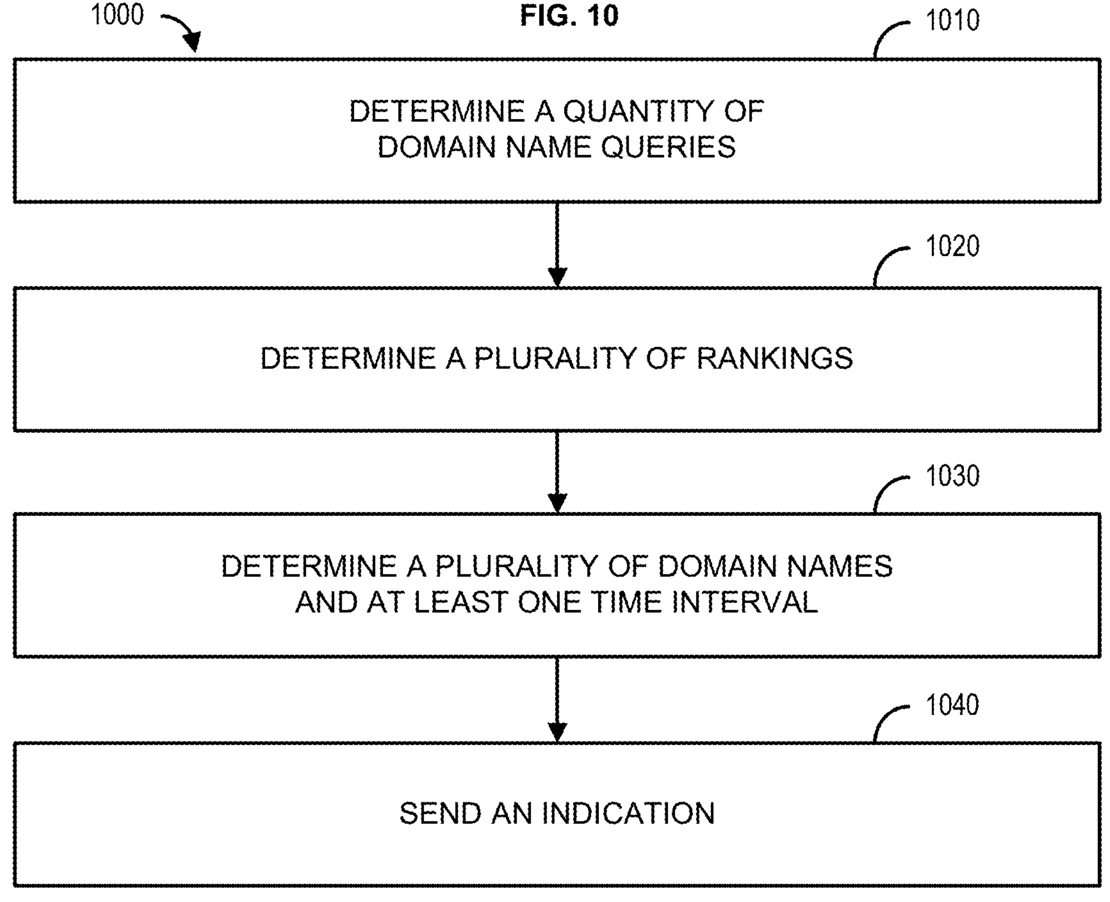
FIG. 10 shows a flowchart for an example method.

FIG. 10 shows a flowchart of an example method 1000 for improved domain name resolution. The method 1000 may be performed in whole or in part by a single computing device, a plurality of computing devices, and the like. For example, the first cache 104, the second cache 108, the third cache 110, the fourth cache 112, the routing device 103, the computing device 801, and/or the server 802 may be configured to perform the method 1000.

As discussed herein, caching routing data at a DNS for every domain name may not be possible or recommended, due to the immense amount of data that would be required as well as capacity limitations of DNS computing devices (e.g., servers, caches, etc.). Data associated with historical domain name queries may be analyzed by a computing device (e.g., any of the devices 103-112 of the system 100) to determine which domain names/websites are most popular during one or more time intervals (e.g., blocks of hours throughout a day(s)). At step 1010, the computing device may determining a quantity of domain name queries for each time interval of a plurality of time intervals. For example, the computing device may determine the quantity of domain name queries for each time interval for each domain name of a plurality of domain names. At step 1020, the computing device may determine a ranking for each domain name of the plurality of domain names based on the quantity of domain name queries. The computing device may determine a ranking for each domain name for each time interval of the plurality of time intervals.

At step 1030, the computing device may determine a subset of the plurality of domain names and at least one time interval of the plurality of time intervals. For example, the computing device may determine the subset of domain names and the at least one time interval based on the ranking for each domain name of the plurality domain names for each time interval of the plurality of time interval. At step 1040, the computing device may send an indication of: routing data associated with the subset of the plurality of domain names and the at least one time interval (e.g., for storage in memory). For example, the computing device may send the indication to a cache. The cache may comprise a plurality of computing devices (e.g., the caches 104,108, 110,112). Each computing device of the plurality of computing devices may store the routing data for a period of time based on the at least one time interval. For example, the cache may determine a time-to-live (TTL) element corresponding to the at least one time interval. The cache may determine the TTL element based on the indication identifying the at least one time interval. The TTL element may be configured to cause the routing data to be cleared from storage after a period of time (e.g., at the end of the at least one time interval).

The computing device may determine that the routing data is to be excluded from storage at the cache for a second period of time that corresponds to a second time interval (e.g., a time interval during which the domain name is less popular). The computing device may determine that the routing data is to be excluded from storage at the cache for the second period of time based on the ranking for the first domain name for the first time interval and a ranking for the first domain name for the second time interval. The computing device may send an indication to the cache that the routing data is to be excluded from storage for the second period of time.

The cache may receive a first domain name query associated with a first domain name of the subset of the plurality of domain names. The cache may receive the first domain name query from a client device (e.g., the client device 102). The cache may determine, based on the routing data, an identifier associated with the first domain name (e.g., an IP address of a server associated with the domain name). The cache may send the identifier associated with the first domain name to the client device.

Figure 11:
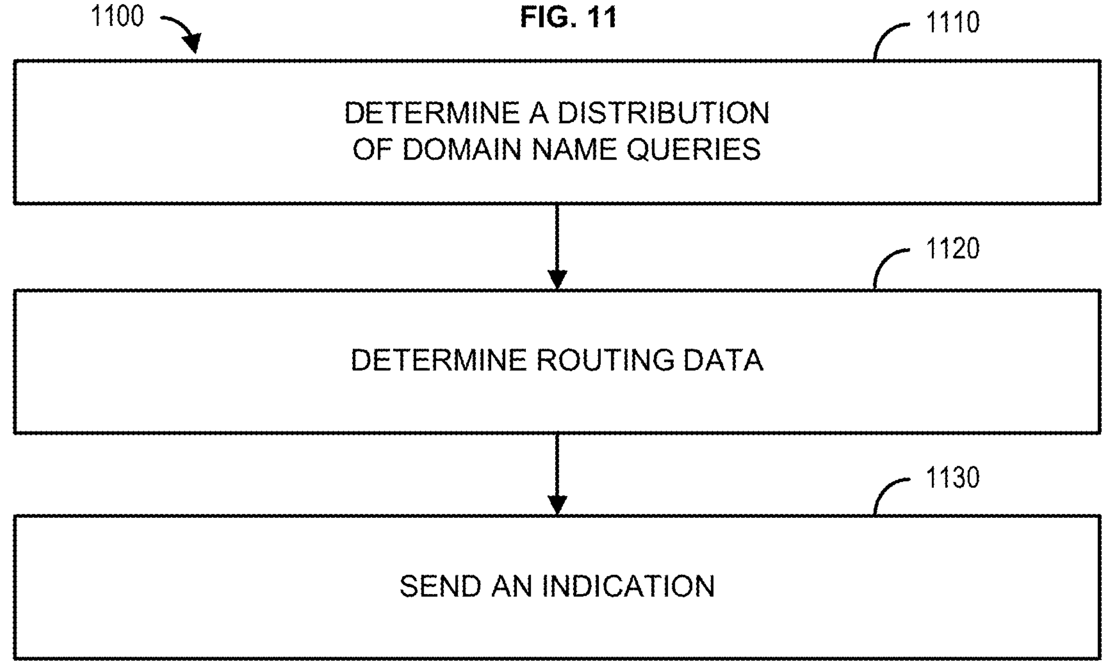
FIG. 11 shows a flowchart for an example method.

FIG. 11 shows a flowchart of an example method 1100 for improved domain name resolution. The method 1100 may be performed in whole or in part by a single computing device, a plurality of computing devices, and the like. For example, the first cache 104, the second cache 108, the third cache 110, the fourth cache 112, the routing device 103, the computing device 801, and/or the server 802 may be configured to perform the method 1100.

As discussed herein, caching routing data at a DNS for every domain name may not be possible or recommended, due to the immense amount of data that would be required as well as capacity limitations of DNS computing devices (e.g., servers, caches, etc.). Data associated with historical domain name queries may be analyzed by a computing device (e.g., any of the devices 103-112 of the system 100) to determine which domain names/websites are most popular during one or more time intervals (e.g., blocks of hours throughout a day(s)). At step 1110, a routing device (e.g., the routing device 103) may determine a distribution of domain name queries associated with a first time interval. The distribution may be indicative of a quantity of domain name queries for each domain name of a plurality of domain names. Each portion of a plurality of portions of the distribution may comprise a substantially equal quantity of domain name queries. At step 1120, the routing device may determine routing data associated with each portion of a plurality of portions of the distribution. For example, the routing device may determine the routing data based on a plurality of caches associated with the routing device (e.g., a quantity/number of caches). The routing data may comprise domain name resolution data for a first subset of the plurality of domain names.

At step 1130, the routing device may send an indication of the first time interval and the routing data associated with at least one portion of the plurality of portions of the distribution. The routing device may send the indication of the first time interval and the routing data associated with the at least one portion of the distribution to each cache of the plurality of caches. The plurality of caches may comprise a plurality of computing devices (e.g., the caches 104,108, 110,112) that each store the routing data for a period of time based on the at least one time interval.

At least two caches of the plurality of caches may comprise routing data for a same domain name. The at least two caches may be associated with a group identifier (e.g., an IP address) for routing purposes. For example, the routing device (or the at least two caches) may determine a group for load balancing/redundancy purposes based on a number of hops between each of the at least two caches and the routing device. The at least two caches may form a group associated with a group identifier (e.g., an IP address). The group identifier may be assigned by the at least two caches, the routing device, etc. The at least two caches may comprise the routing data for the first subset of the plurality of domain names. The routing device may use the group identifier to route domain name queries for one or more domain names within the first subset to the at least two caches.

While specific configurations have been described, it is not intended that the scope be limited to the particular configurations set forth, as the configurations herein are intended in all respects to be possible configurations rather than restrictive. Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that an order be inferred, in any respect. This holds for any possible non-express basis for interpretation, including: matters of logic with respect to arrangement of steps or operational flow; plain meaning derived from grammatical organization or punctuation; the number or type of configurations described in the specification.

It will be apparent to those skilled in the art that various modifications and variations may be made without departing from the scope or spirit. Other configurations will be apparent to those skilled in the art from consideration of the specification and practice described herein. It is intended that the specification and described configurations be considered as exemplary only, with a true scope and spirit being indicated by the following claims.

What is claimed is:

1. A method comprising:

determining, based on a quantity of domain name queries associated with a domain name determined for a first time interval of a plurality of time intervals of a first period of time, that routing data associated with the domain name is to be stored for a second time interval of a plurality of time intervals of a second period of time that starts after an end of the first period of time;

sending, to a first cache at a first geographic location, an indication of the first time interval and the routing data, wherein, based on the indication, the routing data is stored for a period of time at the first geographic location that corresponds to the second time interval of the second period of time; and sending, to a second cache at a second geographic location, an indication of the first time interval and the routing data, wherein, based on the indication, the routing data is stored for a period of time at the second geographic location that corresponds to the second time interval of the second period of time.

2. The method of claim 1, further comprising determining, based on the quantity of domain name queries for a third time interval of the plurality of time intervals of the first period of time, that the routing data is to be excluded from storage for a time that corresponds to a fourth time interval of the plurality of time intervals of the second period of time.

3. The method of claim 2, further comprising:

sending, to the first cache at the first geographic location, an indication that the routing data is to be excluded from storage for the time that corresponds to the fourth time interval of the plurality of time intervals of the second period of time; and sending, to the second cache at the second geographic location, an indication that the routing data is to be excluded from storage for the time that corresponds to the fourth time interval of the plurality of time intervals of the second period of time.

4. The method of claim 3, wherein the time that corresponds to the fourth time interval of the plurality of time intervals of the second period of time comprises a range of time associated with the first geographic location and a range of time associated with the second geographic location.

5. The method of claim 1, further comprising determining, based on a ranking for the domain name for the first time interval of the plurality of time intervals of the first period of time, that the routing data is to be stored for a time corresponding to the second time interval of the plurality of time intervals of the second period of time.

6. The method of claim 5, further comprising determining, based on the quantity of domain name queries for the first time interval for the domain name relative to domain name queries for a plurality of domain names during the first time interval, the ranking.

7. The method of claim 1, further comprising:

sending, to the first cache at the first geographic location based on a domain name query associated with the domain name received from a client device during the second time interval of the plurality of time intervals of the second period of time, a request for an identifier associated with the domain name; and sending, to the client device, the identifier associated with the domain name.

8. One or more non-transitory computer-readable media storing processor-executable instructions that, when executed by at least one processor, cause the at least one processor to:

determine, based on a quantity of domain name queries associated with a domain name determined for a first time interval of a plurality of time intervals of a first period of time, that routing data associated with the domain name is to be stored for a second time interval of a plurality of time intervals of a second period of time that starts after an end of the first period of time;

send, to a first cache at a first geographic location, an indication of the first time interval and the routing data, wherein, based on the indication, the routing data is stored for a period of time at the first geographic location that corresponds to the second time interval of the second period of time; and send, to a second cache at a second geographic location, an indication of the first time interval and the routing data, wherein, based on the indication, the routing data is stored for a period of time at the second geographic location that corresponds to the second time interval of the second period of time.

9. The one or more non-transitory computer-readable media of claim 8, wherein the processor-executable instructions further cause the at least one processor to determine, based on the quantity of domain name queries for a third time interval of the plurality of time intervals of the first period of time, that the routing data is to be excluded from storage for a time that corresponds to a fourth time interval of the plurality of time intervals of the second period of time.

10. The one or more non-transitory computer-readable media of claim 9, wherein the processor-executable instructions further cause the at least one processor to:

send, to the first cache at the first geographic location, an indication that the routing data is to be excluded from storage for the time that corresponds to the fourth time interval of the plurality of time intervals of the second period of time; and send, to the second cache at the second geographic location, an indication that the routing data is to be excluded from storage for the time that corresponds to the fourth time interval of the plurality of time intervals of the second period of time.

11. The one or more non-transitory computer-readable media of claim 10, wherein the time that corresponds to the fourth time interval of the plurality of time intervals of the second period of time comprises a range of time associated with the first geographic location and a range of time associated with the second geographic location.

12. The one or more non-transitory computer-readable media of claim 8, wherein the processor-executable instructions further cause the at least one processor to determine, based on a ranking for the domain name for the first time interval of the plurality of time intervals of the first period of time, that the routing data is to be stored for a time corresponding to the second time interval of the plurality of time intervals of the second period of time.

13. The one or more non-transitory computer-readable media of claim 12, wherein the processor-executable instructions further cause the at least one processor to determine, based on the quantity of domain name queries for the first time interval for the domain name relative to domain name queries for a plurality of domain names during the first time interval, the ranking.

14. The one or more non-transitory computer-readable media of claim 8, wherein the processor-executable instructions further cause the at least one processor to:

send, to the first cache at the first geographic location based on a domain name query associated with the domain name received from a client device during the second time interval of the plurality of time intervals of the second period of time, a request for an identifier associated with the domain name; and send, to the client device, the identifier associated with the domain name.

15. An apparatus comprising:

one or more processors; and memory storing processor-executable instructions that, when executed by the one or more processors, cause the apparatus to:

determine, based on a quantity of domain name queries associated with a domain name determined for a first time interval of a plurality of time intervals of a first period of time, that routing data associated with the domain name is to be stored for a second time interval of a plurality of time intervals of a second period of time that starts after an end of the first period of time;

send, to a first cache at a first geographic location, an indication of the first time interval and the routing data, wherein, based on the indication, the routing data is stored for a period of time at the first geographic location that corresponds to the second time interval of the second period of time; and send, to a second cache at a second geographic location, an indication of the first time interval and the routing data, wherein, based on the indication, the routing data is stored for a period of time at the second geographic location that corresponds to the second time interval of the second period of time.

16. The apparatus of claim 15, wherein the processor-executable instructions further cause the apparatus to determine, based on the quantity of domain name queries for a third time interval of the plurality of time intervals of the first period of time, that the routing data is to be excluded from storage for a time that corresponds to a fourth time interval of the plurality of time intervals of the second period of time.

17. The apparatus of claim 16, wherein the processor-executable instructions further cause the apparatus to:

send, to the first cache at the first geographic location, an indication that the routing data is to be excluded from storage for the time that corresponds to the fourth time interval of the plurality of time intervals of the second period of time; and send, to the second cache at the second geographic location, an indication that the routing data is to be excluded from storage for the time that corresponds to the fourth time interval of the plurality of time intervals of the second period of time.

18. The apparatus of claim 17, wherein the time that corresponds to the fourth time interval of the plurality of time intervals of the second period of time comprises a range of time associated with the first geographic location and a range of time associated with the second geographic location.

19. The apparatus of claim 15, wherein the processor-executable instructions further cause the apparatus to determine, based on a ranking for the domain name for the first time interval of the plurality of time intervals of the first period of time, that the routing data is to be stored for a time corresponding to the second time interval of the plurality of time intervals of the second period of time.

20. The apparatus of claim 19, wherein the processor-executable instructions further cause the apparatus to determine, based on the quantity of domain name queries for the first time interval for the domain name relative to domain name queries for a plurality of domain names during the first time interval, the ranking.

21. The apparatus of claim 15, wherein the processor-executable instructions further cause the apparatus to:

send, to the first cache at the first geographic location based on a domain name query associated with the domain name received from a client device during the second time interval of the plurality of time intervals of the second period of time, a request for an identifier associated with the domain name; and send, to the client device, the identifier associated with the domain name.

* * * * *